United States Patent [19]
Biddlecomb

[11] 3,943,561
[45] Mar. 9, 1976

[54] SYSTEM FOR OPTICALLY DETECTING MOVING TARGETS

[75] Inventor: Ralph W. Biddlecomb, Lutherville, Md.

[73] Assignee: Westinghouse Electric Corporation, Pittsburgh, Pa.

[22] Filed: Aug. 6, 1973

[21] Appl. No.: 386,149

[52] U.S. Cl............................ 358/81; 178/DIG. 33
[51] Int. Cl.²........................................... H04N 7/18
[58] Field of Search 178/DIG. 33, DIG. 37, DIG. 38, 178/6.8; 343/5 CD; 358/81, 82

[56] References Cited
UNITED STATES PATENTS

| | | | |
|---|---|---|---|
| 3,156,110 | 11/1964 | Clynes | 343/5 C D |
| 3,307,142 | 2/1967 | Doebler | 343/5 C D |
| 3,527,880 | 9/1970 | Gordon | 178/DIG. 33 |
| 3,614,720 | 10/1971 | Ludlum | 343/5 C D |
| 3,715,480 | 2/1973 | Levine | 178/DIG. 33 |
| 3,829,613 | 12/1974 | Melchior | 178/6.8 |

*Primary Examiner*—Howard W. Britton
*Assistant Examiner*—Michael A. Masinick
*Attorney, Agent, or Firm*—R. M. Trepp

[57] ABSTRACT

A system is disclosed for optically detecting a target moving within a field of view. In particular, such a system includes a monochromatic image detector for generating a video signal corresponding to the field of view through which a target to be detected moves. The video signal is applied to a monochromatic TV receiver for displaying the applied video signals upon a suitable color display capable of displaying the applied video signal in at least two different colors or wavelengths of radiation. Switching circuitry is provided for applying a complete frame of the video signal to the display device to effect display of that frame in the first color and thereafter for applying a frame of the video signal to effect display of that frame in the succeeding color or colors. The rate at which the first and subsequent frames of the video signal are applied to the display means is such that such frames are displayed within a time period corresponding to that of the integration period of the human eye, e.g. .1–.2 seconds. Further, the color display is so adjusted that in the absence of a moving target within the field of view, the first and succeeding frames of the first and succeeding colors are in balance to present a monochromatic display, whereas if a target moves through the field of view, color aberrations appear above the periphery of the displayed moving target.

6 Claims, 3 Drawing Figures

SYSTEM FOR OPTICALLY DETECTING MOVING TARGETS

BACKGROUND OF THE INVENTION

1. Field of the Invention

This invention relates to systems for detecting moving targets, and in particular to hose systems adapted for displaying the moving target in the manner capable of ready recognition thereof with respect to the field of view background.

2. Description of the Prior Art

In the prior art, there has arisen a need for systems capable of detecting the movement of an object within a defined field of view. For example, there are installations to be protected against the intrusion of unidentified persons. Similar systems have been developed to detect the presence or approach of moving airplanes.

In the prior art, systems have been developed utilizing a TV camera for observing a field of view for detecting the movement of an object or target therein. Typically, such systems apply frames of the video signal sensed at first and second points in time, to a suitable storage medium such as a magnetic disk recorder, whereby the first and second frames of the video signals may be subtracted from each other to provide a difference signal indicative of the movement of an object within the field of view. In such systems since the background within the field of view remains the same, these portions of the images are subtracted from each other and do not appear in the display. However, if an object within the field of view moves between frames or images, a difference signal is generated and is displayed, indicating that the object has moved.

A similar type of display may be achieved with direct view storage tubes, wherein the first frame of the video signal is stored upon a storage grid thereof and the second frame is applied to modulate a read electron beam, directed toward the storage grid whereon the first frame of information is stored. The stored first image modulates the read beam of electrons whereby the displayed image indicates the difference between the first and second frames. As a result, the object moving within the field of view is displayed upon the direct view storage tube.

Both of the above-described systems require the use of an expensive storage device such as a magnetic disk recorder or a direct view storage tube, and of additional complex circuitry for subtracting stored signals as in the case of the magnetic disk recorder, or timing circuitry whereby the video signals are applied in the desired sequence to the direct view storage tube.

SUMMARY OF THE INVENTION

It is therefore an object of this invention to provide a new and improved moving target detector system which does not employ expensive storage devices and which may be implemented in a simple, inexpensive manner.

In accordance with this and other objects, this invention is directed toward a moving target detector system comprising a monochromatic camera device for providing a video signal of a field of view through which objects to be detected move. Such video signals are applied to a display device capable of displaying an image in at least first and second colors or wavelengths. Further, switching circuitry is provided for applying at least first and second frames of the video signal to the display device whereby the first and second frames respectively are displayed sequentially in the first and second colors within a time period corresponding to the integration period of the human eye or other integrating sensor. The color balance of the display device is so adjusted that portions of the field of view which do not change between the first and second frames are displayed monochromatically, whereas an object moving within the field of view is displayed with color aberrations about its peripheral edges.

In one illustrative embodiment of this invention, a color cathode ray tube is employed having separate electron guns for writing the first and second frames of the video signal upon a luminescent screen assembly capable of displaying the first and second colors.

BRIEF DESCRIPTION OF THE DRAWINGS

The above and other objects and features of the invention will become more apparent in view of the subsequent detailed description taken in conjunction with the accompanying drawings which form a part of this specification, and in which.

DESCRIPTION OF THE PREFERRED EMBODIMENTS

Figure 1:
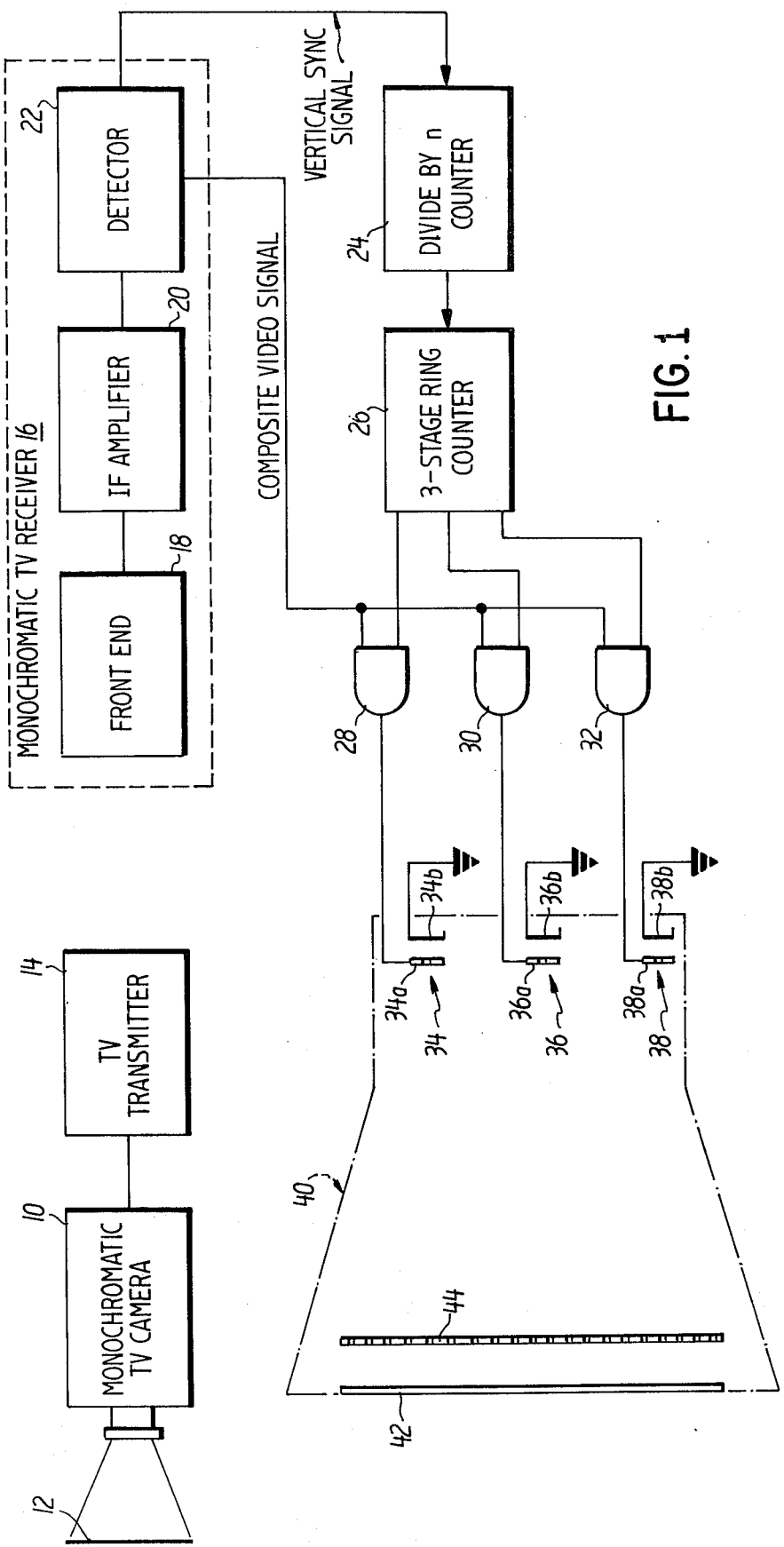
FIG. 1 is a schematic diagram of a moving target detector system in accordance with the teachings of this invention.

With regard to the drawings and in particular to FIG. 1, there is shown an illustrative embodiment of this invention including a monochromatic TV camera 10 for providing a video signal corresponding to a field of view represented by the numeral 12, through which an object to be detected moves. Though any type of transmission system could be used, a TV transmitter 14 of conventional design is shown in FIG. 1 for transmitting the video signal to a monochromatic TV receiver 16. The monochromatic TV receiver 16, as illustrated in FIG. 1, may be a conventional black-and-white TV set including a front end portion 18 for detecting the transmitted signal, an IF amplifier 20 and a detector 22 for providing a composite video signal and a vertical sync signal. The details of the monochromatic TV receiver are well-known in the art and are only schematically represented in FIG. 1 for the sake of clarity. In a manner to be explained, the composite video signal including all color components as sensed by the monochromatic TV camera 10 is applied to the display device 40 illustratively taking the form of a three-gun, shadow mask CRT, as shown in FIG. 1. The construction of such a display device 40 is well-known in the art and such details as the deflection and acceleration electrodes and the aligning coils have been deleted for the sake of clarity. In an illustrative embodiment, the receiving and display device may be a conventional TV receiving set, modified as explained below. Alternatively, the monochromatic TV camera and control circuit corresponding to the receiver 16 may take the form of a closed circuit TV camera and control circuit as sold by Herbach and Rademan, Inc. and designated type HV-50 or HV-15.

The composite video signal is applied to the display device 40 so that a single frame of the video signal is displayed in a single color or wavelength of radiation. In particular, the display device 40 includes, respectively, red, green and blue electron guns 34, 36 and 38, each comprising a cathode element further identified by the letter b and a control grid further identified by the letter a. In a manner to be explained, the composite video signal is applied sequentially to the control grids 34a, 36a and 38a, whereby successive frames of red, green and blue are written by the respective electron guns upon the luminescent screen 42 through the openings of a shadow mask 44.

As shown in FIG. 1, switching circuitry is added for displaying successively entire frames of red, green and blue images within an integration period of time in which the output display derived from the luminescent screen 42 is viewed. For example, if a human operator is observing the display device 40, the integration period effected by his eye is in the range of .1–.2 seconds. It may be understood that the frames displayed by the device 40 may be directed onto other sensors such as photographic film, whose integration period may be considerably longer, dependent upon the film's sensitivity. As shown in FIG. 1, the vertical sync signal derived from the detector 22 is applied to a divide-by-n counter 24 which determines the number $n$ of frames of the video signal applied to each of the electron guns 34, 36 and 38. In one illustrative embodiment of this invention, the frame rate is 60 Hz (according to the standard adopted in the United States), and $n$ is set by the counter 24 to equal 2, whereby two frames of each of red, green and blue are displayed upon the device 40 within .1 second. By adopting conventional resistive networks, the balance or intensity of the red, green and blue images is adjusted so that in the absence of an object moving within the field of view 12, the successive red, green and blue images are integrated by the human eye and appear as a black-and-white or monochromatic image.

Figure 3:
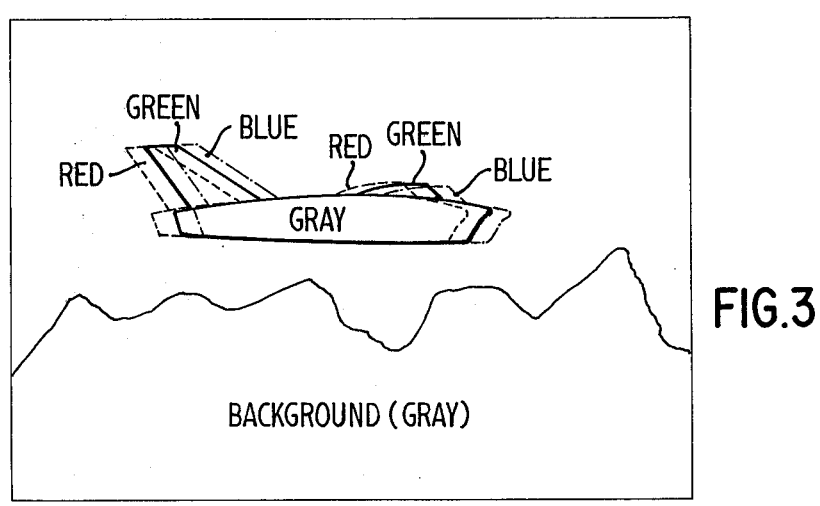
FIG. 3 shows an image as displayed upon the cathode ray tube incorporated into the system shown in FIG. 1.

The switching circuitry further includes a three-stage ring counter 26 whose three outputs as shown in FIG. 1 are applied to AND gates 28, 30 and 32, whereby the composite video signal is applied successively after an interval of $n$ frames to the next electron gun. In operation, an output is derived from the detector 22 upon the occurrence on each frame of the composite video signal. After $n$ such signals have been applied and counted by the counter 24, an output is derived therefrom and applied to the three-stage ring counter 26. In response to each input signal, the three-stage ring counter 26 advances one stage and the enabling ouput shifts from one output to the next to enable its corresponding AND gate. In this manner, $n$ frames of the video signal are applied successively to each of the electron guns 34, 36 and 38, whereby $n$ complete frames of the video signal are displayed in a single color before writing with the next electron gun. If an object moves within the field of view 12 between the display of the successive color frames, a misregistration of the colors will be caused and the peripheral edges of the moving object will no longer appear as a monochromatic or black-and-white figure. Rather, the proper balance of colors is disturbed and color aberrations will appear about the periphery of the displayed moving object as illustrated in FIG. 3.

Below, there is provided an analysis of the minimum speed of the moving target that a system in accordance with the teachings of this invention is capable of detecting for an illustrative frame rate and number of lines in the TV display. Assuming a TV frame time of 1/60 second, 525-lines per frame and a vertical field of view of approximately 15°, a picture element ($P_X$) subtends 1/500 of the vertical field of view and a frame-to-frame displacement of one picture element will produce an optically detectable color aberration. In other words, the picture element ($P_X$) subtends under the above-stated conditions .52 milliradians and the movement of an object through this angle produces a detectable color aberration.

Figure 2:
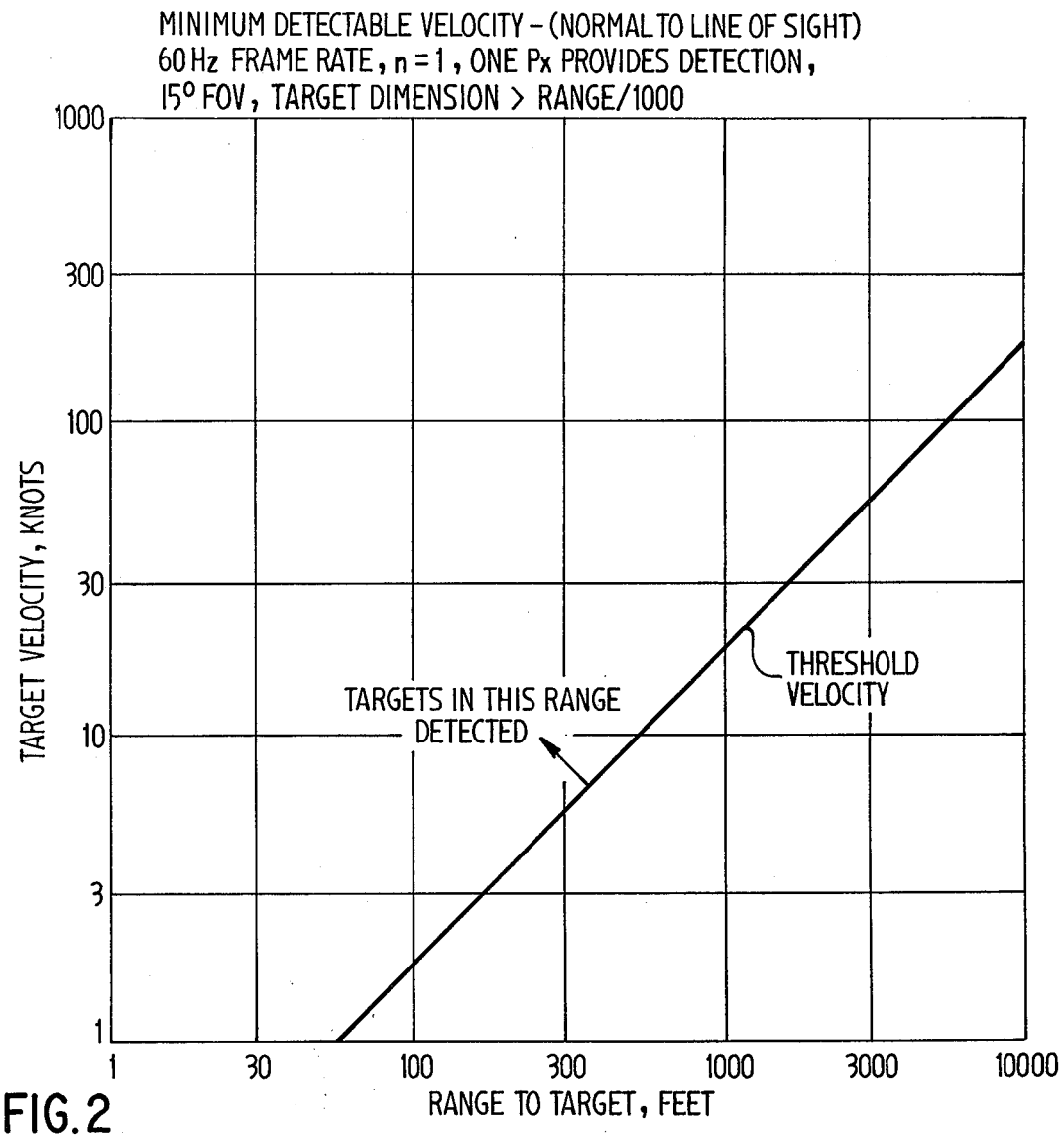
FIG. 2 is a graph indicating the minimum detectable velocity of a moving target within the field of view of the system shown in FIG. 1 as a function of the range of the target to the system.

Further, as seen in FIG. 2, the minimum detectable linear movement of the target (normal to the line of sight of the camera 10) is a function of range in kilofeet (R), in accordance with the following formula for the above-assumed display conditions:

$$d = R(.52) \text{ feet.}$$

Thus, at a nominal range of 1000 feet, the minimum detectable movement is $d$=0.52 feet. Since the frame rate was chosen to be 1/60 second, the minimum detectable target velocity equals 31.2ft./sec. or 18.7 knots.

With regard to FIG. 3, there is shown an airplane moving against a fixed background. If it is assumed that the target moves at 180 knots across the field of view and the horizontal dimension of the airplane's rudder is 10 feet, then at the frame rate of 1/60 second the rudder will move across the field of view five feet. Assuming the above-noted display parameters, the system of this invention will detect the rudder movement if the target range is less than approximately 9600 feet.

Thus, there has been shown a system for optically detecting moving targets without the use of complex, expensive storage devices that may be implemented by conventional black-and-white receiver circuitry and color CRT. As demonstrated above, the system of this invention is sufficiently sensitive to target movement having such target range and velocity to be useful in many applications. Thus, in contrast to radar type systems which detect movement toward or away from the sensor, this invention detects motion normal to the line of sight and may be used to complement typical radar systems.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A system for detecting movement of an object within a field of view, said system comprising:
   a monochromatic TV camera for providing a composite video signal including all color components as sensed by said monochromatic TV camera to form a plurality of frames indicative of said field of view,
   said composite video signal being the same from frame to frame in the absence of movement in said field of view,
   display means for receiving the composite video signal and operative in a first mode for displaying a first frame to form an image of said field of view in a first color and operative in a second mode for displaying a second frame to form an image of said field of view in a second color differing from said first color; and control means for operating said display means in its first and second modes within a predetermined integration time period whereby a moving object is distinguished in the image of said field of view displayed by said display means by color aberration about its peripheral edge portions.

2. The system as claimed in claim 1, wherein the integration time period is selected to be the integration period of the human eye.

3. The system as claimed in claim 1, wherein said display means displays the first and second colors in such balance that those portions of said field of view which do not move between the display of the first and second frames are displayed as a composite of the first and second colors without color aberration about their peripheral edge portions.

4. The system as claimed in claim 1, wherein said control means includes a counter responsive to each frame of the video signal for providing an output corresponding to n number of frames whereby $n$ frames of a single color are displayed by said display means before the display of the next color.

5. The system as claimed in claim 1, wherein said display means comprises a cathode ray tube having first and second luminscent screen portions for respectively providing the first and second colors, and first and second electron guns for directing corresponding electron beams reespectively upon the first and second phosphors.

6. The system as claimed in claim 5, wherein said control means comprises a switching circuit for applying the video signal to the first electron gun to display a first frame of the first color and thereafter to said second electron gun to display a second frame of the second color.

* * * * *